(No Model.)

C. BABCOCK.
COMBINED COLLAR STUD AND NECKTIE HOLDER.

No. 320,452. Patented June 23, 1885.

WITNESSES:
N. Davenport
John F. Booth

INVENTOR
Chas. Babcock
BY
Geo. A. Mosher
ATTORNEY.

UNITED STATES PATENT OFFICE.

CHARLES BABCOCK, OF TROY, NEW YORK.

COMBINED COLLAR-STUD AND NECKTIE-HOLDER.

SPECIFICATION forming part of Letters Patent No. 320,452, dated June 23, 1885.

Application filed March 28, 1885. (No model.)

*To all whom it may concern:*

Be it known that I, CHARLES BABCOCK, a resident of the city of Troy, in the county of Rensselaer and State of New York, have invented certain new and useful Improvements in Collar-Stud and Necktie-Holder Combined; and I do hereby declare that the following is a full, clear, and exact description of the invention that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in collar-studs and necktie-holders combined.

The object of my invention is to provide a collar-stud with an adjustable hook that can be concealed within the stud when the collar is secured thereon, and afterward caused to project from the head of the stud to engage a portion of the necktie.

My invention consists, first, in connecting an inner plate or shoe with an outer slotted plate or head by a tube or hollow stud and providing a stem adapted to slide within said tube longitudinally of the same, the stem having at one end a hook adapted to enter and be concealed in said slotted head; second, in providing said hooked stem with a spring-catch adapted to engage with said head to prevent its withdrawal therefrom, and with a stop or aperture upon the tube to hold the hook within the head.

Figure 1:
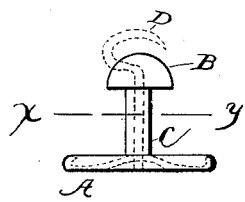
Figure 2:
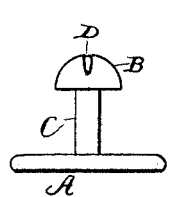
Figure 3:
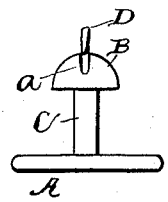
Figure 4:
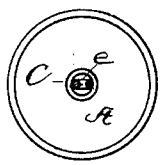
Figure 5:
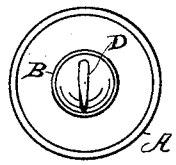
Figure 6:
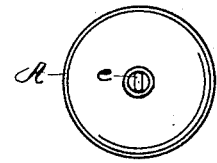
Figure 7:
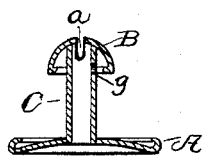
Figure 8:
Figure 9:
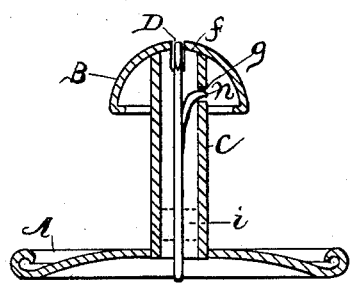

Figure 1 of the drawings is a side elevation showing by dotted lines the hook projecting from the head. Fig. 2 is a front elevation showing the hook concealed within the head. Fig. 3 is same, showing the hook projecting. Fig. 4 is a cross-section, taken at broken line *x y* in Fig. 1. Fig. 5 is a top plan view of the device. Fig. 6 is a bottom view. Fig. 7 is a central vertical section with the hook removed. Fig. 8 is a side elevation of the hook, stem, and spring-catch. Fig. 9 is a central vertical section with hook, stem, and catch in position therein, on an enlarged scale.

A is the inner plate or shoe connected with the outer plate or head, B, by the tube C. The latter extends up into the head, as shown in Fig. 7, the head and tube being provided with coincident slots $a$, adapted to receive the hook D, as shown in Figs. 2, 5, and 9. The stem $e$, which supports at one end the hook, may be provided at the other with a piston, $i$, (shown by dotted lines in Fig. 9,) adapted to fit the opening in the tube to regulate the position of the hook and stem; but I prefer to provide the stem with the spring-catch $n$, adapted to enter the stop or aperture $g$ in the tube, as shown in Fig. 9, to hold the hook concealed within the slotted head. The lower end of the stem projects below the surface of the shoe A, when the hook is concealed, as shown in Fig. 9, in which position the collar is attached to the stud in the usual manner. After the collar is attached, the hook can be easily projected to the position shown in Fig. 3, and by dotted lines in Fig. 1, by pressing upon the projecting end of the stem $e$, to overcome the force of the spring and cause the catch $n$ to leave the opening $g$. The catch passes up against the lip $f$, formed by the slot in the head of the stud, which prevents the hook from being drawn entirely out of the stud. After the hook has been thus projected out from the head of the stud, it is in a favorable position to engage an overlying necktie and hold it securely in position, preventing it from slipping up on the collar or around to one side. By thus concealing the hook until the collar is secured in place all danger of hooking the fingers of the operator or catching upon his garments is avoided, and the hook is easily thrust out ready for use in holding the necktie; or it may be allowed to remain concealed and be used like any common stud. Should a hook be broken or otherwise injured another can be easily substituted in its place, as the hook is not fixed to the stud at any point. As the supporting-stem extends down directly beneath the longitudinal center of the hook, there is no tendency to turn the hook to rotate the stem when engaged by the necktie, and the slot in the head and tube also serve to prevent any rotation of the stem in the tube. The end of the slot in the head also serves to afford a bearing and support for the back of the hook, which greatly strengthens it and prevents its bending or getting out of place.

I am aware that hooks have been fixed to studs for holding neckties in place, and that safety-pins have been secured to studs by spring-catches, and I do not broadly claim the same.

What I claim as new, and desire to secure by Letters Patent, is—

1. In a combined collar-stud and necktie-holder, a shoe and slotted head connected by a tubular stud or post, in combination with a hook adapted to enter the slot in the head, and provided with a supporting-stem adapted to travel longitudinally within said post, substantially as and for the purposes set forth.

2. A collar-stud composed of a shoe and slotted head connected by a tubular stud or post, in combination with a hook adapted to pass in and out of said head and supported by a stem having a spring-catch adapted to engage with stops in said post or head, substantially as described, and for the purposes set forth.

In testimony whereof I have hereunto set my hand this 26th day of March, 1885.

CHARLES BABCOCK.

Witnesses:
GEO. A. MOSHER,
CHAS. L. ALDEN.